Jan. 31, 1967  D. C. STEWART ETAL  3,300,914
HOUSE TRAILER WITH SWINGABLE EXTENSION
Filed Oct. 6, 1964  3 Sheets-Sheet 1

INVENTORS
DOUGLAS C. STEWART, MORRIS I. ADAIR
& EDWIN E. GERLACH
BY
Barnes, Kisselle, Rausch & Choate
ATTORNEYS Jan. 31, 1967 D. C. STEWART ETAL 3,300,914
HOUSE TRAILER WITH SWINGABLE EXTENSION
Filed Oct. 6, 1964 3 Sheets-Sheet 2
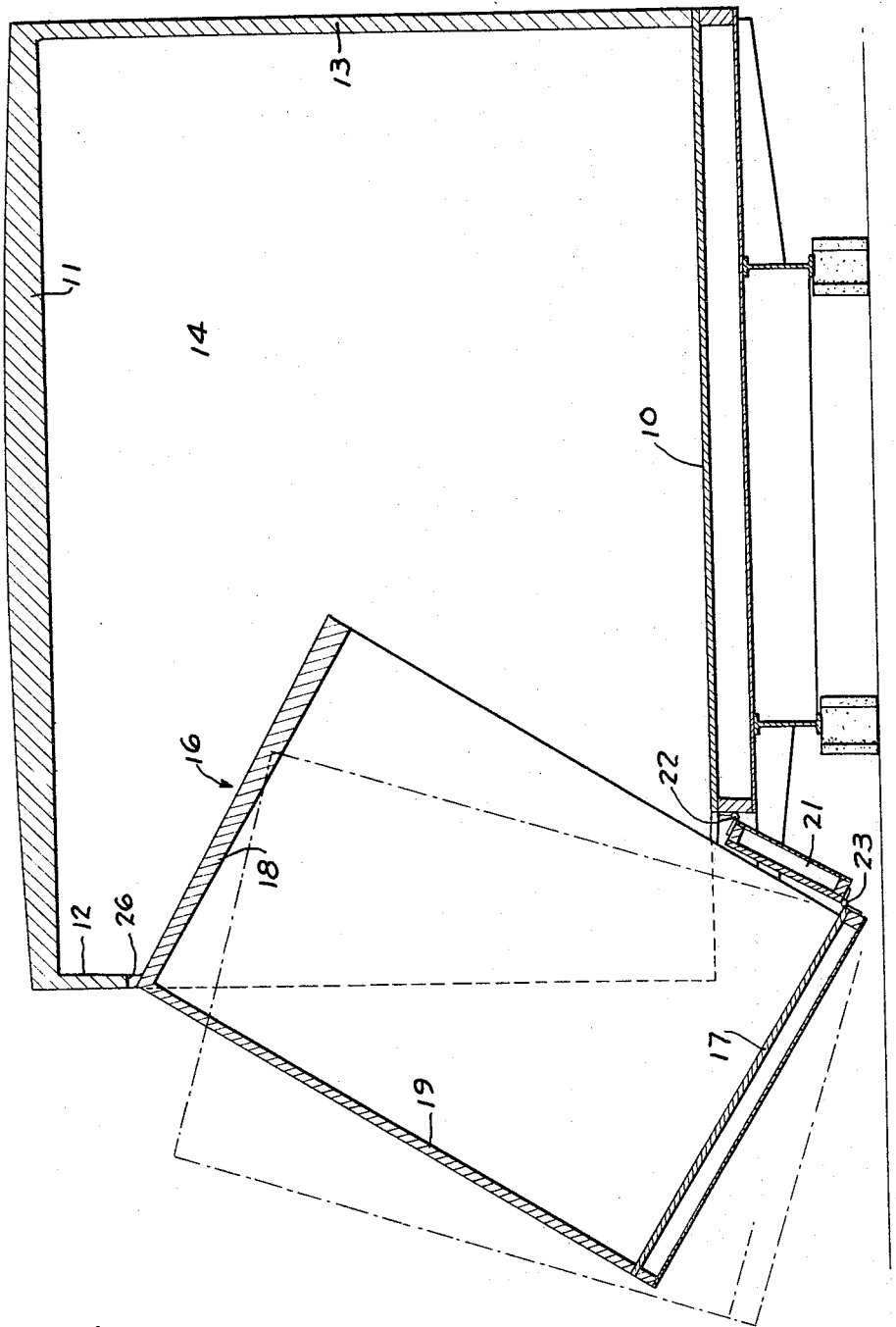
FIG. 3
FIG. 4
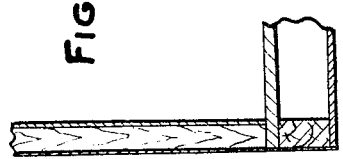
INVENTORS
DOUGLAS C. STEWART, MORRIS I. ADAIR
& EDWIN E. GERLACH
BY
Barnes, Kisselle, Raisch + Choate
ATTORNEYS

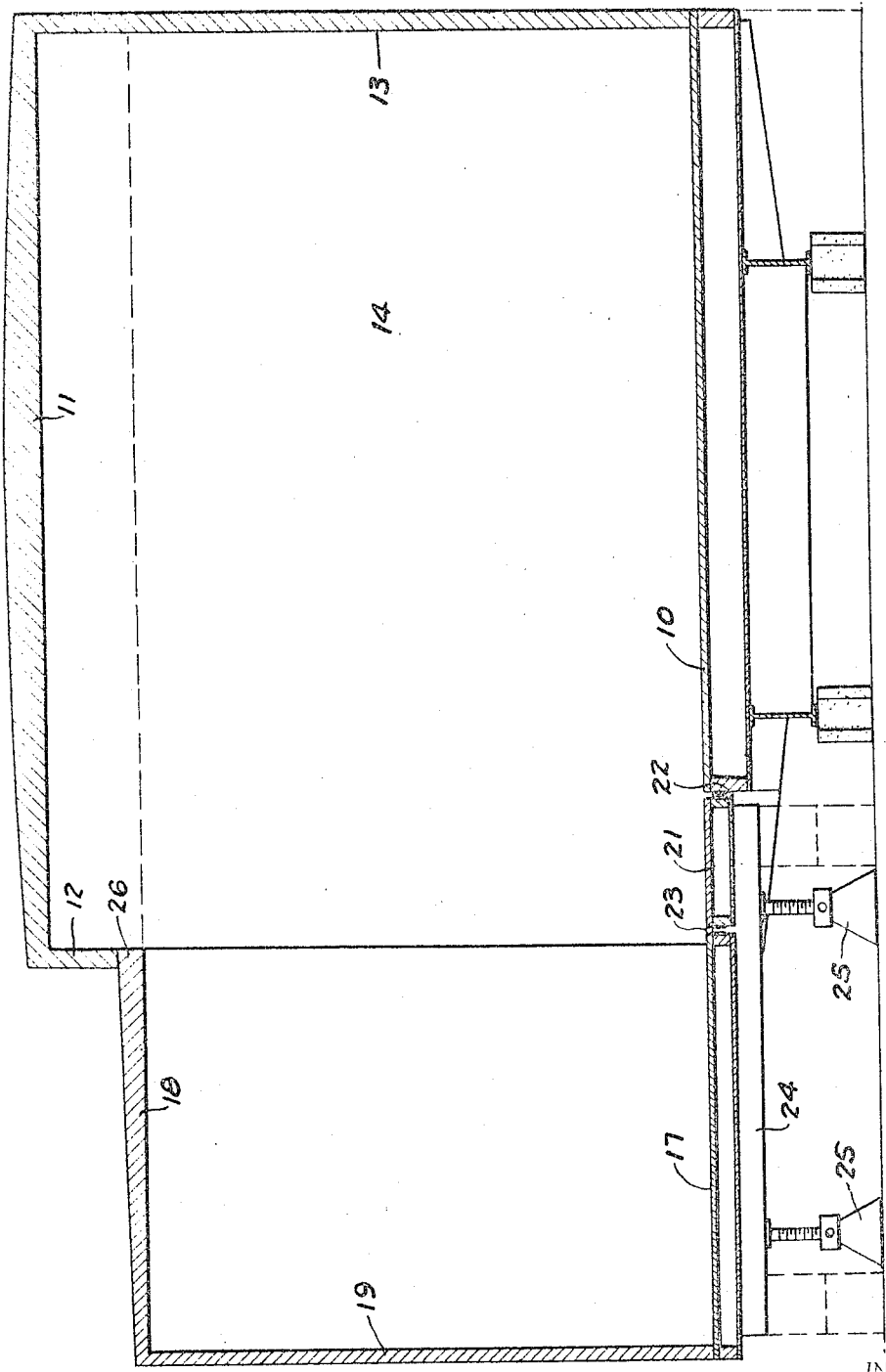

3,300,914
HOUSE TRAILER WITH SWINGABLE
EXTENSION
Douglas C. Stewart, Morris I. Adair, and Edwin E. Gerlach, Marlette, Mich., assignors to Active Homes Corporation, a corporation of Michigan
Filed Oct. 6, 1964, Ser. No. 401,889
10 Claims. (Cl. 52—67)

This invention relates to house trailers and particularly to house trailers of the type having substantial width which are transported by wheels to a home site where the trailer is mounted on blocks or the like to provide a semi-permanent home.

In house trailers which are conventionally made, it is often found that in order to permit transportation on the highway, the house trailer is provided with an extension within the trailer that is folded outwardly when the house trailer is brought to the home site to provide an additional space. In such extensions, in order to provide for the outward swinging movement of the extension, the ceiling portion of the extension is inclined thereby reducing the headroom.

It is therefore an object of this invention to provide a house trailer embodying an extension wherein the extension has maximum headroom.

It is a further object of the invention to provide such a house trailer which is simple and inexpensive to construct.

Basically, the house trailer embodying the invention comprises an extension, incorporating a top, bottom, side and end panels, which is mounted for movement from a position within the trailer to a position externally of the trailer in a manner such that the extension can be initially swung downwardly to clear the upper edge of the opening in the side of the trailer and thereafter be moved upwardly to its position so that the bottom panel of the extension is in flush relation with the bottom wall or floor of the trailer.

In the drawings:

FIG. 3 is a view similar to FIG. 2 showing the extension in partially expanded position.

FIG. 4 is a fragmentary sectional view of a portion of the trailer.

FIG. 5 is a view similar to FIGS. 2 and 3 showing the extension in expanded position.

Figure 1:
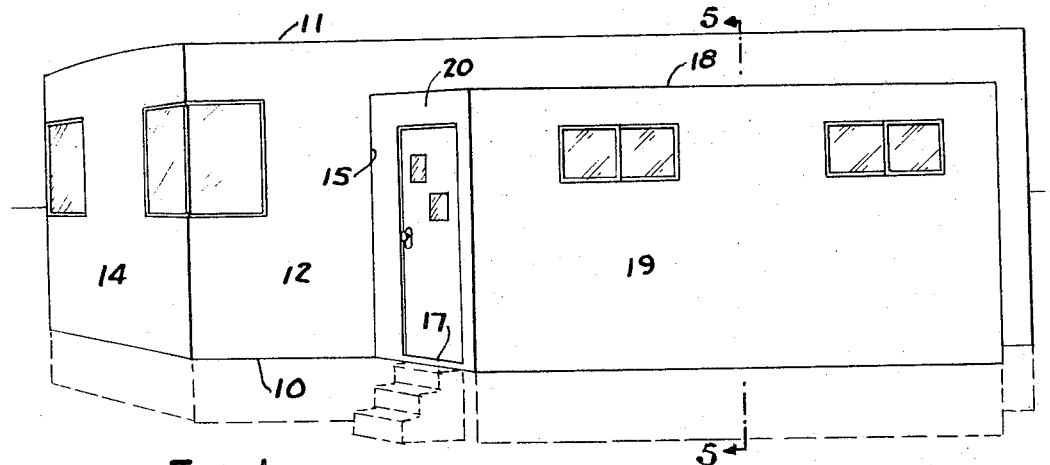
FIG. 1 is a perspective view of the trailer embodying the invention.
Figure 2:
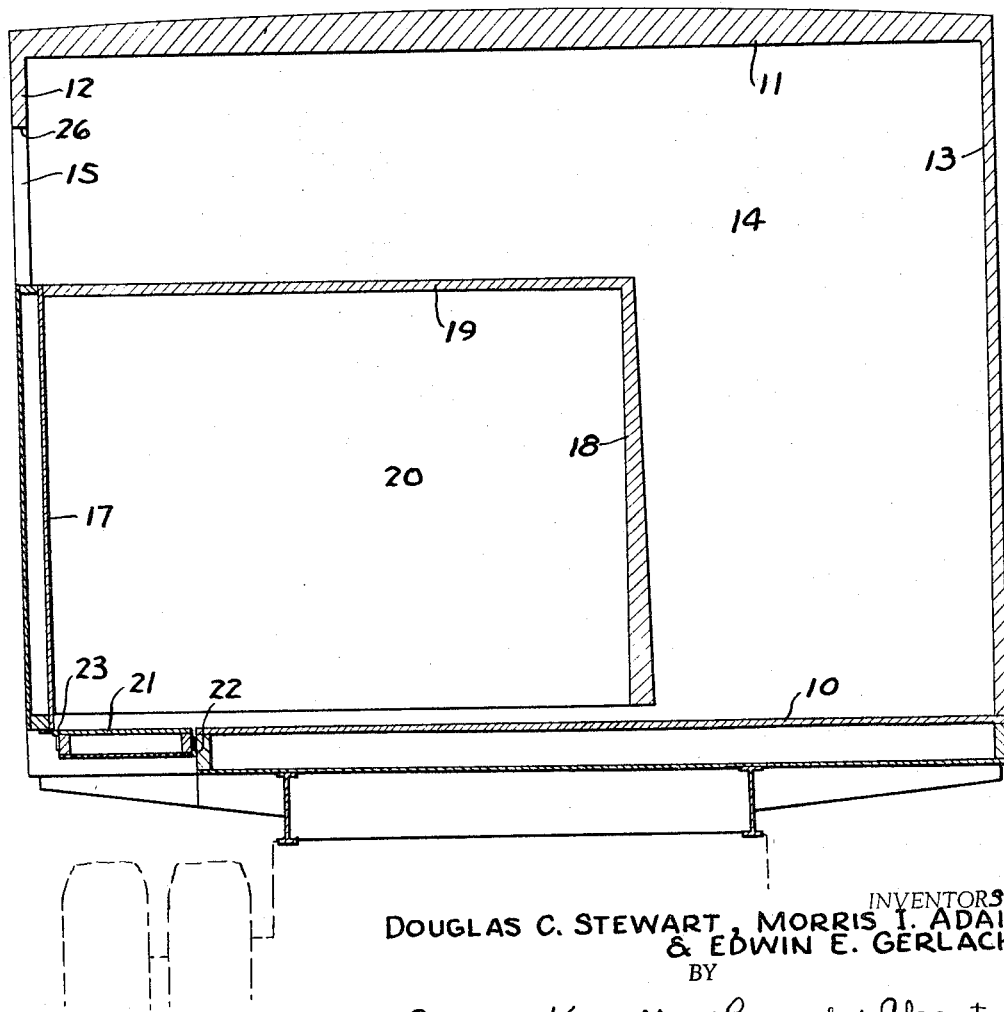
FIG. 2 is a transverse sectional view of the trailer embodying the invention showing the extension in folded or stored position.

Referring to FIGS. 1 and 2, the house trailer embodying the invention is of conventional construction and comprises a bottom wall or floor 10, a top wall 11, side walls 12 and 13 and end wall 14. The construction of the walls is conventional and may comprise spaced panels as shown in FIG. 4. The side and end walls can be provided with windows or doors as may be desired. In accordance with the invention, side wall 12 is provided with an opening 15 in which an extension 16 is positioned. The extension 16 comprises a bottom panel 17, a top panel 18 generally parallel to bottom panel 17, side panel 19 and end panels 20 that thereby provide a generally rectangular rigid structure.

The extension 16 is connected to the bottom wall 10 of the trailer by an intermediate member 21 which is positioned in a cut away portion of bottom wall 10 and pivoted to the bottom wall 10 by a hinge 22 at one end and to the bottom panel 17 by a hinge 23 at the other end.

As shown in FIGS. 2, 3 and 5, the intermediate member 21 and the bottom panel 17 are of substantially uniform thickness. The pivotal axis of the hinge 23 lies in substantially the same plane as the upper surfaces of the bottom panel 17 and the intermediate panel 21 when the extension 16 is in extended position. The pivotal axis of the hinge 22 is displaced below the top surface of the intermediate member and the bottom wall 10 when the extension is in extended position. The edge of bottom wall 10 adjacent opening 15 is spaced from the vertical plane of the opening 15 and the width of intermediate member is such that the pivotal axes of the hinges 22, 23 lie inwardly of the plane of the side opening 15.

When the extension 16 is in extended position, as shown in FIG. 5, transverse strut members 24 are provided beneath the bottom panel 17 and intermediate panel 21 and are supported by jacks 25 to maintain the bottom panel 17 and intermediate member 21 in extended position and, in turn, the extension 16 in proper position.

When the trailer is being transported on the highway, the extension 16 is folded within the trailer and the upper surface of intermediate member 21 is flush with the upper surface of bottom wall 10 as shown in FIG. 2. Upon arrival at the home site, the extension 16 is swung downwardly about the axis of the hinge 22 thereby lowering the axis of the hinge 23 to a position, as shown in FIG. 3, such that the extension 16 can then be swung about the axis of the hinge 23 to thereby clear the upper edge 26 of the opening 15. After the top panel 18 clears the upper edge 26, the extension 16 can be moved bodily upwardly to bring the upper surfaces of the intermediate member 21 and bottom panel 17 into flush relation with the upper surface of the bottom wall 10 of the trailer. The struts 24 and jacks 25 are then placed in position to maintain this relationship.

By this arrangement, the extension 16 can have the top panel 18 at a substantially right angle to the side panel 19 and with maximum vertical height between the bottom panel 17 and top panel 18 so that maximum headroom is achieved.

We claim:
1. In a house trailer or the like, the combination comprising
   a bottom wall,
   a top wall,
   side walls and end walls joining the top and bottom walls,
   one of said side walls having an opening therein,
   and an extension movable from a position within the trailer to a position exteriorly of the trailer comprising
      a bottom panel,
      a top panel,
      a side panel joining the top and bottom panels along one edge,
      and means mounting said extension along the bottom edge of the side opening in the trailer adjacent the bottom wall for swinging movement about an axis adajacent the other edge of the bottom panel and bodily swinging movement about an axis spaced from the first mentioned axis and adjacent the bottom edge of the side opening of the trailer whereby when the extension is in folded position within the trailer, the extension can be folded outwardly clearing the upper edge of the side opening of the trailer by bodily rotating the extension downwardly to move the other edge of the bottom panel of the extension downwardly, thereafter swinging the extension about said axis adjacent the other edge of the bottom panel to clear the upper edge of the side opening and finally moving the bottom panel and, in turn, the extension into a position wherein the bottom panel and the bottom wall of the trailer lie in generally the same plane.
2. In a house trailer or the like, the combination comprising a bottom wall, a top wall, side walls and end walls joining the top and bottom walls, one of said side walls having an opening therein, and an extension movable from a position within the trailer to a position exteriorly of the trailer comprising a bottom panel, a top panel, a side panel joining the top and bottom panels along one edge, an intermediate member, first hinge means for hinging said intermediate member along one edge to the bottom wall of the trailer adjacent the lower edge of the side opening in the trailer, second hinge means for hinging the other edge of said intermediate member to the other edge of the bottom panel such that the extension can be folded outwardly from a folded position within the trailer by swinging the intermediate member downwardly about said first hinge means, thereafter swinging the extension outwardly about said second hinge means to clear the upper edge of the side opening and finally swinging the intermediate member to a position in general alignment with the bottom wall of the trailer.

3. The combination set forth in claim 2 wherein said bottom wall of the trailer and bottom panel of the extension are of substantially uniform thickness such that brace members can be provided therebeneath after the extension is folded outwardly to support the bottom wall and the bottom panel and the intermediate member in substantially the same plane.

4. The combination set forth in claim 2 wherein said first hinge means has a pivotal axis adjacent and spaced from the top surface of the bottom wall of the trailer and said second hinge means has a pivotal axis substantially in the plane of the top surface of the bottom panel of the extension and the top surface of the intermediate member when the bottom panel and intermediate member are in alignment.

5. In a house trailer or the like, the combination comprising a bottom wall, a top wall, side walls and end walls joining the top and bottom walls, one of said side walls having an opening therein, and an extension movable from a position within the trailer to a position exteriorly of the trailer comprising a bottom panel, a top panel, a side panel joining the top and bottom panels along one edge, an intermediate member, first hinge means for hinging said intermediate member along one edge to the bottom wall of the trailer adjacent the lower edge of the side opening in the trailer, second hinge means for hinging the other edge of said intermediate member to the other edge of the bottom panel such that the extension can be folded outwardly from a folded position within the trailer by swinging the intermediate member downwardly about said first hinge means and thereafter swinging the extension outwardly about said second hinge means to clear the upper edge of the side opening and thereafter swinging the intermediate member to a position in general alignment with the bottom wall of the trailer, the pivotal axis of said intermediate member to said bottom panel and the pivotal axis of the bottom panel to the intermediate member lying within the vertical confines of the trailer.

6. In a house trailer or the like, the combination comprising a bottom wall, a top wall, side walls and end walls joining the top and bottom walls, one of said side walls having an opening therein, and an extension movable from a position within the trailer to a position exteriorly of the trailer comprising a bottom panel, a side panel extending from along one edge of the bottom panel, and means mounting said extension along the bottom edge of the side opening in the trailer adjacent the bottom wall for a swinging movement about an axis adjacent the other edge of the bottom panel and bodily swinging movement about an axis spaced from the first mentioned axis and adjacent the bottom edge of the side opening of the trailer whereby when the extension is in folded position within the trailer, the extension can be folded outwardly clearing the upper edge of the side opening of the trailer by bodily rotating the extension downwardly to move the other edge of the bottom panel of the extension downwardly, thereafter swinging the extension about an axis adjacent the other edge of the bottom panel to clear the upper edge of the side opening and finally moving the bottom panel and, in turn, the extension into a position wherein the bottom panel and the bottom wall of the trailer lie in generally the same plane.

7. In a house trailer or the like, the combination comprising a bottom wall, a side wall, said side wall having an opening therein, and an extension movable from a position within the trailer to a position exteriorly of the trailer comprising a bottom panel, a side panel extending along one edge of the bottom panel, an intermediate member, first hinge means for hinging said intermediate member along one edge to the bottom wall of the trailer adjacent the lower edge of the side opening in the trailer, second hinge means for hinging the other edge of said intermediate member to the other edge of the bottom panel such that the extension can be folded outwardly from a folded position within the trailer by swinging the intermediate member downwardly about said first hinge means, thereafter swinging the extension outwardly about said second hinge means to clear the upper edge of the side opening, and thereafter swinging the intermediate member to a position in general alignment with the bottom wall of the trailer.

8. The combination set forth in claim 7 wherein said bottom wall of the trailer and bottom panel of the extension are of substantially uniform thickness such that brace members can be provided therebeneath after the extension is folded outwardly to support the bottom wall and the bottom panel and the intermediate member in substantially the same plane.

9. The combination set forth in claim 7 wherein said first hinge means has a pivotal axis adjacent and spaced from the top surface of the bottom wall of the trailer and said second hinge means has a pivotal axis substantially in the plane of the top surface of the bottom panel of the extension and the top surface of the intermediate member when the bottom panel and intermediate member are in alignment.

10. In a house trailer or the like, the combination comprising
a bottom wall,
a top wall,
side walls and end walls joining the top and bottom walls,
one of said side walls having an opening therein,
and an extension movable from a position within the trailer to a position exteriorly of the trailer comprising
a bottom panel,
a top panel substantially parallel to said bottom panel,
a side panel joining the top and bottom panels along one edge,
an intermediate member,
first hinge means for hinging said intermediate member along one edge to the bottom wall of the trailer adjacent the lower edge of the side opening in the trailer,
second hinge means for hinging the other edge of said intermediate member to the other edge of the bottom panel such that the extension can be folded outwardly from a folded position within the trailer by swinging the intermediate member downwardly about said first hinge means, thereafter swinging the extension outwardly about said second hinge means to clear the upper edge of the side opening, and thereafter swinging the intermediate member to a position in general alignment with the bottom wall of the trailer, the pivotal axis of said intermediate member to said bottom panel and the pivotal axis of the bottom panel to the intermediate member lying inwardly of the plane of the opening in the side wall.

References Cited by the Examiner
UNITED STATES PATENTS

| | | | |
|---|---|---|---|
| 3,194,251 | 7/1965 | Pettersen | 296—23 X |
| 3,200,545 | 8/1965 | Bunge | 52—67 X |

FOREIGN PATENTS

| | | |
|---|---|---|
| 1,139,741 | 2/1957 | France. |
| 1,236,538 | 6/1960 | France. |

FRANK L. ABBOTT, *Primary Examiner.*

M. O. WARNECKE, *Assistant Examiner.*